United States Patent [19]

Gerry

[11] 4,258,296

[45] Mar. 24, 1981

[54] INDUCTIVE-CAPACITIVE CHARGE-DISCHARGE IGNITION SYSTEM

[76] Inventor: Martin E. Gerry, 13452 Winthrope St., Santa Ana, Calif. 92705

[21] Appl. No.: 44,301

[22] Filed: May 31, 1979

[51] Int. Cl.³ .................. H05B 37/02; H05B 39/04; H05B 41/36

[52] U.S. Cl. .................. 315/209 R; 315/172; 315/174; 315/176; 123/606; 123/637; 315/209 T

[58] Field of Search ............ 315/209 T, 209 CD, 176, 315/209 R, 172, 174; 123/148 E

[56] References Cited

U.S. PATENT DOCUMENTS

| | | | |
|---|---|---|---|
| 3,906,919 | 9/1975 | Asik et al. | 315/209 CD |
| 3,972,315 | 8/1976 | Munden et al. | 315/209 CD |
| 4,033,316 | 7/1977 | Birchenough | 315/176 |
| 4,106,462 | 8/1978 | Hildebrandt et al. | 315/209 T |
| 4,136,301 | 1/1979 | Shimojo et al. | 315/172 |
| 4,167,927 | 9/1979 | Mikami et al. | 315/209 T |

Primary Examiner—Saxfield Chatmon, Jr.

[57] ABSTRACT

An inductive-capacitive charge-discharge ignition system includes an ignition transformer primary winding and a capacitor to be charged by a unipolar alternating current source. An electronic switch connects the primary winding and capacitor in parallel during the discharge mode of the system so that the discharge current from the capacitor aids the discharge current in the primary winding. Rectifiers may be used between the outputs of the source and the primary winding and capacitor. Another version of this system employs DC power to charge the primary winding, and the unipolar source to charge the capacitor, with a rectifier between the source and capacitor. Another capacitor may be used in the secondary winding of the ignition transformer. The system may be controlled by a variety of timers. A high velocity igniter arc having luminous particles surrounding a more concentrated filament of such luminous particles is developed by the system extending across the entire base of an igniter.

11 Claims, 8 Drawing Figures

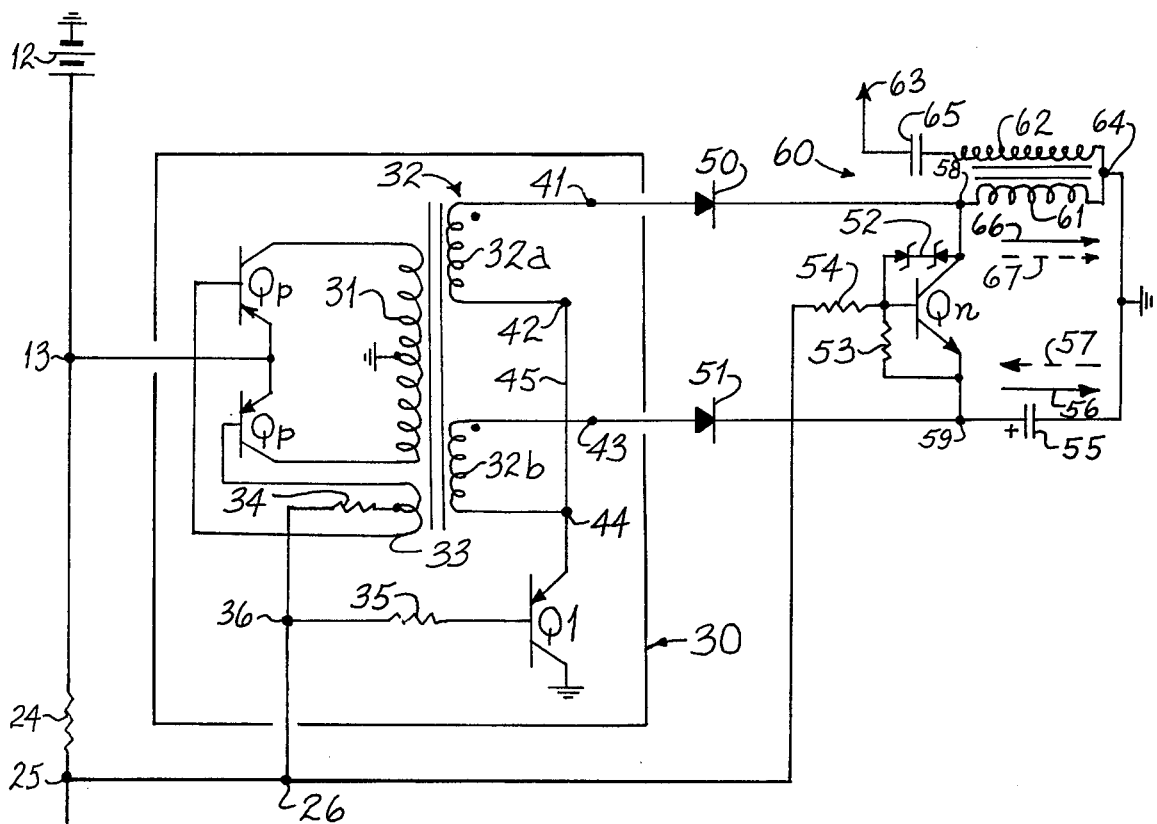
FIG. 1
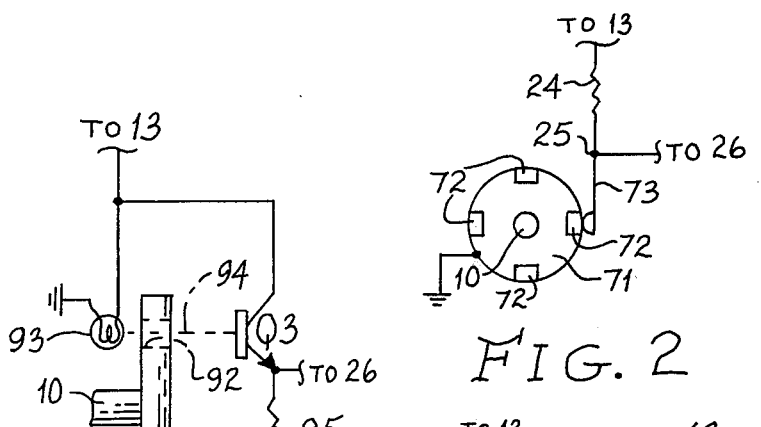
FIG. 2
FIG. 4
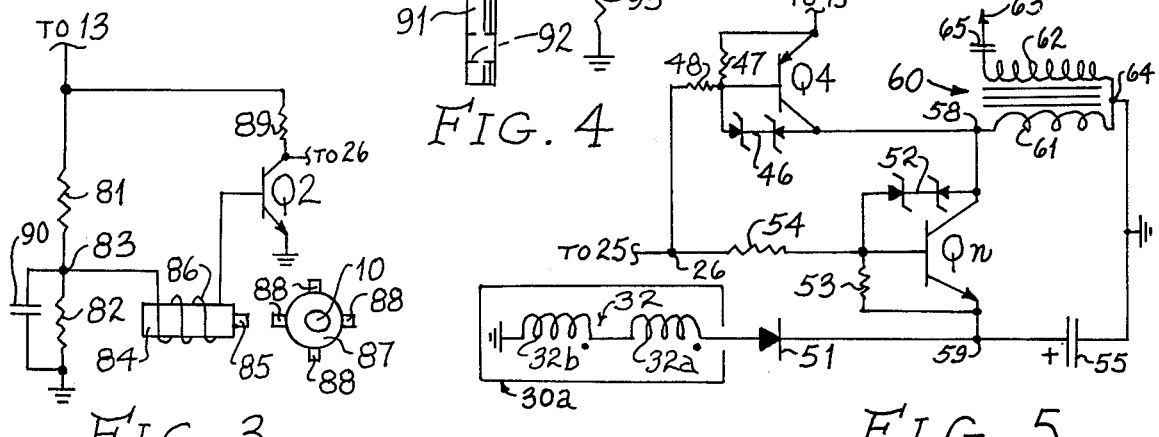
FIG. 3
FIG. 5

INDUCTIVE-CAPACITIVE CHARGE-DISCHARGE IGNITION SYSTEM

BACKGROUND OF THE INVENTION

This invention is in the field of ignition systems for fuel burning engines and in particular in such ignition systems which have both a capacitor and an inductive winding of an ignition transformer which is charged, and discharged in discharge aiding mode, and particularly wherein such system produces a high velocity igniter arc.

The principal prior art ignition systems may be categorized into three groups. The first category of such prior art systems, referred to as the Kettering system, uses a capacitor in series with a primary winding of an ignition transformer wherein the capacitor is short-circuited by a timer so as to permit the primary winding to be charged by a DC source. The timer then removes the short circuit from the capacitor to permit the charged winding to discharge into the capacitor so as to create a single ringing circuit component, used to fire an igniter.

The second category of such prior art systems, referred to as a capacitive discharge system, also has a capacitor in series with an ignition transformer winding. Controlled by an appropriate timer, the capacitor is charged, generally by a higher DC voltage than in the Kettering system, such higher DC voltage being generated in the system. The timer then enables the charged capacitor to discharge into the transformer winding also creating a single ringing current component of somewhat higher voltage peak than the Kettering system to fire an igniter.

The third category of such prior art systems involves the use of a genenrated AC wave by such prior art system and attempts to apply such generated wave either to an ignition transformer or directly to a distributor in order to fire an igniter.

With respect to the first category, or Kettering prior art system, the main problem lies in the fact that the system attempts to precharge an inductor using a DC source in anticipation of an igniter firing cycle. It is well-known that an inductor energized by DC cannot charge to its full current level in a short period of time, and therefore, cannot rapidly produce an induced voltage therein. Hence, only a portion of the maximum current quantity can be made to flow through the primary winding during the charging mode, with consequent nonuse of the full energy storage capability of such primary winding, and therefore, loss of electrical power delivery capability to fire the igniter is experienced.

The current conduction through an inductor powered by a DC source, such as a battery, when switched on by the timer may be expressed as:

$$i = \frac{V_{dc}}{R}(1 - e^{-\frac{R}{L}t})$$

where i is the current at any instant of time, t is time, $V_{dc}$ is the voltage provided by the DC source, R is the circuit resistance of the inductor and DC source, L is the inductance of the primary winding and R/L is the time constant of the circuit.

From such equation, it can be seen that when t=0, i=0, and when t approaches infinity, i approaches the value of $V_{dc}/R$. Based on typical values of L and R, it would take about 100 milliseconds for the primary winding to be almost fully charged, and a typical primary winding charging period is generally not greater than 5 milliseconds.

It is, therefore, obvious that the use of a DC source to charge the primary winding of the Kettering or first category of ignition systems, without other means of generating energy, is self-defeating in that possibly no more than half the inductor's charge capacity can be effectively utilized.

With respect to the second category or capacitive discharge system, a like result, with very little improvement over the Kettering system, is realized.

In such second category system, the higher DC voltage to precharge the capacitor is obtained by using an electronic oscillator to generate a higher AC voltage which is then converted to DC by rectification and filtering. The higher DC voltage is controlled by a timer to precharge the capacitor and then discharge the capacitor into the ignition transformer winding to fire an igniter. If one keeps in mind that a charged capacitor is just like a DC source, then one can apply the foregoing equation which defines current in the transformer winding. Although the value of $V_{dc}$ representing the charged capacitor will be higher than in the case of the Kettering system, one must not lose sight of the fact that the energy content of a charged capacitor is limited by the capacitance and hence its ability to deliver current for an extended time period is limited. Hence, although a higher peak single ringing cycle will result due to the charge from the capacitor being dumped into the transformer winding, the single ringing period will be substantially shortened compared with the single ringing period of the Kettering system.

Since energy is a function of the product of power and time, the advantage of the capacitive discharge system over the Kettering system is minimized due to the lesser amount of time during which energy is present to fire the igniter.

With respect to the third category of prior art ignition systems of the AC systems, the major problem resides in the inability of the prior art to recognize how to transfer the power from the AC generator to the load, the load generally being a transformer. Consequently, although such system might basically be able to provide AC power over longer periods of time, these systems suffer from the lack of technique in effectively transferring such power and particularly providing higher current levels to the load.

The need for such higher current levels has been repeatedly stated in periodicals and patents written by those in the automotive manufacturing industry and in the automotive fuel-producing industry such as Texaco. Such periodicals or patents generally show a high power AC rectangular wave generator employing a transformer wherein one of the windings thereof is used to saturate the transformer core by employing a DC source connected to that winding, so as to prevent the generator from producing power. A timer, coupled to such winding, enables the core to go out saturation, and ostensible enables the generator to provide AC power by magnetic induction through a high voltage winding of the transformer to an igniter load.

The basic problem with such generator resides in the high impedance experienced in the electronic circuit of the generator where the transistors are located, when under actual load conditions such as when the igniter is attempting to arc. Reflected impedance of the high voltage winding into the lower voltage winding to which the transistors are connected plus the self-impedance of such lower voltage winding would severely limit the current circulating in the collector-emitter circuits, and consequently would result in a lowered voltage and severely reduced current levels deliverable to the actual igniter. Thus, not only is the voltage across the so-called high voltage winding of such prior art AC system lower than expected, but the required higher current level for feeding the igniter in order to overcome high pressure fuel-flow across the igniter base, and in particular where the air-to-fuel ratio is in the order of 18 to 1 or greater (lean-burn engines), is not available.

Additionally, such prior art AC systems are inhibited from rapid duty cycling of their AC generator principally by magnetically saturating the generator's transformer core to inhibit oscillations. Sight is lost of the fact that the DC current used to saturate such core results in a comparatively long time for the core to reach saturation (see formula above), and hence slows up the cycling of the generator between its operative and quiescent mode. As a result, the prior art AC systems provide triangular-shaped current waveforms which inherently have slow rates of chage in their waveforms as a function of time and therefore result in a reduced induced voltage in the high voltage winding, inasmuch as by Faraday's law of indcution, such reduced voltage is a function of the rate of change of current. It can be appreciated that if, for example, the prior art could have overcome the above problems residual in their AC source and could provide a current waveform output with a fast rate of change, such as one approaching a rectangular waveshape, at least the output voltage of such generator would be increased. However, the problem of being able to deliver higher currents to the load would still remain unsolved.

Accordingly, neither the Kettering, capacitive discharge, nor AC system is capable of delivery of sufficient quantities of energy to fire an igniter, in order to enable the igniter to cause all fuel in an engine cylinder to be consumed and not wasted by failure of the ignition arc to burn same.

A further disadvantage of prior art ignition systems is that they cannot charge the inductor or transformer winding and the capacitor in a way so that discharge currents therefrom are additive and aid each other.

A still further disadvantage of the prior art systems is their inability to deliver sufficient energy to fire an igniter for extended periods of time.

Yet a further disadvantage of the prior art systems is their inability to deliver more than one ringing cycle during an igniter firing period.

Yet another disadvantage of the precharged inductor or capacitor prior art systems is their inability to rapidly charge the inductor due to use of DC power, with attendant inability to deliver sufficient energy to fire an igniter so as to effectively cause all the fuel to burn during an igniter firing period.

Yet another important disadvantage of any prior art system is the inability of the system to accelerate the arc luminous particles to such high velocity so that such arc can adequately overcome internal engine and fuel-flow pressures. Such prior art systems are therefore unable to use an igniter that develops long arc lengths between its electrodes. Such deficiency results in initiation of a small fuel ignited nodule during the initial ignition period which is insufficient in mass and area to cause all fuel in a cylinder to be consumed and not wasted.

Other disadvantages with such prior art systems reside in their complexity due to the need of a large quantity of electronic components which also gives rise to unreliability as well as high cost of production.

SUMMARY OF THE INVENTION

Accordingly, one objective of this invention is to provide an ignition system which would deliver a high energy quantity during each igniter firing period so that all fuel in the engine cylinder would be ignited and converted to useful power without passing any unignited fuel into the engine's exhaust system.

A further objective of this invention is to devise an ignition system wherein the primary winding of the ignition transformer and a capacitor connected thereto would be charged in such way so that discharge currents from the primary winding and capacitor would be additive so as to increase the energy content fed to the igniter.

Yet another objective of this invention is to utilize a power source to charge the primary winding and the capacitor connected thereto which will enable such primary winding and capacitor to be charged rapidly and fully.

Still another important objective of this invention is to provide an ignition system which will develop long arcs across the bases of igniters and wherein such long arcs, composed of luminous particles, shall have velocities substantially higher than velocities or arcs developed either by a Kettering, capacitive discharge or prior art AC systems, so as to overcome high internal engine pressures and high pressure fuel-flow past the electrodes of the igniters.

Yet a further object of this invention is to provide highly reliable electronic circuitry using a minimum number of parts and simple in structure.

Hence, a system is provided which utilizes an electronic repetitive wave generator which is electrically duty cycled, and which generator provides an output of a plurality of unipolar waves during each igniter firing period.

The primary winding of an ignition transformer and a capacitor are charged by a unipolar alternating current generator during the charge mode of the system. Such primary winding and capacitor are connected in parallel during the discharge mode of the system by means of an electronic switch to enable discharge current from the capacitor to aid or be in the same direction as discharge current flowing in the primary winding. In another instance, the primary winding is charged by a DC source whereas the capacitor is charged by means of the unipolar generator.

The manner in which the capacitor and primary winding are charged and discharged enables discharge currents from the capacitor to add to the discharge currents of the primary winding, rather than oppose such primary winding currents, thereby creating a large amplitude ringing cycle having a relatively steep wavefront. Such ringing cycle has extremely high energy content which is delivered to the igniter for firing such igniter during each igniter firing period.

Additionally, the inventive system enables an igniter which is about 250 thousandths of an inch in dimension between its arcing electrodes, to create an arc which may be as long as 350 thousandths of an inch. Such dimension between electrodes is established by removing the gap-adjusting member from a conventional igniter so that arcs can travel between the axial electrode and the inner base periphery. Such arc length would be extinguished in prior art igniter systems, even if such systems were capable of producing such arcs, due to the high internal engine pressure. However, the increased arc velocity of the inventive system, easily overcomes such engine pressure and inhibits extinguishment of these long arcs, which provides for better fuel combustion.

The arc phenomena per se is a matter of additional importance. Such arc is comprised of an elongated filament of highly concentrated luminous particles, which filament extends between the axial electrode and base. The filament is increased in thickness at its ends. Surrounding such filament is an envelope of luminous particles of lesser density than the filament, such envelope having approximately spherically-shaped termination which will often glow like a light bulb.

BRIEF DESCRIPTION OF THE DRAWINGS

FIG. 1 is an electrical schematic of one form of the ignition system in accordance with the invention.

FIGS. 2, 3 and 4 are respectively schematic drawings of a disk-contactor timer, a magnetically generated pulse timer and an optical beam pulse generating timer, any one of which can be used in lieu of the cam actuated contactor timer shown in FIGS. 1 or 5, or as implied in connection with FIGS. 6 or 7.

FIG. 5 is an electrical schematic of another form of the ignition system in accordance with the invention.

DETAILED DESCRIPTION

Figure 6:
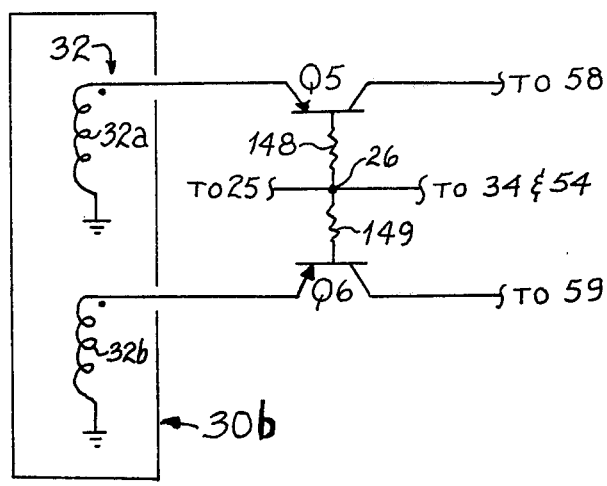
FIG. 6 is a partial electrical schematic representing a slight variation of the schematic of FIG. 1.

Referring to FIG. 1, an ignition system capable of delivering large quantities of electrical energy to an igniter or igniters in a fuel burning engine, employs the principle of inductive-capacitive charge-discharge operations during an igniter firing period. Such system is basically simple in concept, utilizing a minimum number of electronic components, and is highly effective as well as being reliable in its operation.

A conventional ground symbol in the drawing figures refers throughout this specification to negative battery potential which is the zero reference level for DC or AC voltages or currents, and is also a signal return path for AC signals.

Battery 12 provides DC power from its positive terminal 13 to contactor 23 of FIG. 1 configuration timer, and to emitters of the PNP type transistors, labeled Qp in the unipolar alternating current generator 30.

The timer is activated by means of cam 21 driven by a conventional distributor shaft 10 so that contactors 22 and 23 are closed and opened in alternation.

When none of the high portions of cam 21 cooperates with contactor 22, contactors 22 and 23 are closed, and when one of the high portions of cam 21 cooperates with contactor 22, contactors 22 and 23 are open. Contactor 23 is connected at junction 25 to resistor 24, and resistor 24 is connected to junction 13 which is the positive DC terminal of battery 12. Junction 25 is the point in this timer circuit used to connect to biasing resistor 34 connected to feedback winding 33 of the transformer in generator 30, whch generator 30 provides its waveform voltage output across winding 32, the waveform varying substantially between zero potential and a positive potential. Winding 32 comprises winding 32a and winding 32b which are used to provide power to primary winding 61 and capacitor 55 respectively during the charge mode of the system in the FIG. 1 configuration.

PNP type transistors Qp were chosen, since their bases would require zero bias potential to start conduction in these transistors, and this enables generator 30 to supply charging power during the charge mode or the mode when contactors 22 and 23 are closed, which mode is compatible with the charge mode of a conventional ignition system.

The purpose of resistor 24 is to provide a positive DC potential to the bias circuit of generator 30 when contactors 22 and 23 are open, and also to provide a ground or zero potential to bias resistor 34 when contactors 22 and 23 are closed without placing a short-circuit across battery 12.

The cam actuated contactor timer was chosen for its simplicity in illustrating and explaining the switching functions of the system. But it should be noted that a disk-contactor timer, a magnetically generated pulse timer or an optically generated pulse timer as illustrated in FIGS. 2, 3 and 4 respectively may be equally effectively utilized as substitites for the cam actuated contactor timer.

With respect to generator 30, and it should be noted at this point that generator 30a of FIG. 5 is identical to generator 30 except for the omission of transistor switch Q1 therein, such generator 30 is basically referred to as the Royer type oscillator, the operation of which is explained in detail in the publication entitled Tape Wound Cores, Bulletin TC-101-C, published by Arnold Engineering Company of Marengo, Illinois, Copyright 1972, at pages 45 and 46 including a circuit diagram thereof at page 45. Such oscillator has been improved by reduction of the number of resistors and elimination of diodes therein, duty cycling the oscillator so it is operating only when used to power external means and improving the reliability thereof as well as utilizing Darlington type transistors Qp therein. The addition of switch Q1 in the common leg of output windings 32a and 32b is for the purpose of providing current interruption at the end of the charge mode so as to avoid having residual charge in the core of the oscillaotr's transformer from being passed into primary winding 61 of transformer 60. Such interruption of charge current will assure clean separation between firing periods of igniters of the several waveforms constituting ignition currents or voltages due to discharge of primary winding 61 and capacitor 55.

Windings 32a and 32b have dots at terminals 41 and 43 respectively indicating the like polarities of those ends of the windings due to an induced voltage from winding 31. Terminals 42 and 44 commonly connected by means of wire 45, are used to connect these output windings to the emitter of PNP transistor Q1, the collector thereof being at ground potential. Q1 is turned on and off simultaneously with the turning on and off of the Qp transistors since both types of transistors are of the PNP type. Resistor 35 connected to terminal junction 36 which is also connected to junction 26, is terminated at control junction 25 from where all transistor switches are turned on and off.

Accordingly, terminal 41 of winding 32a is connected through rectifier or diode 50 to terminal 58 of primary winding 61 providing a feed path of power from generator 30 to winding 61 during the charge mode. Likewise, winding 32b is connected at its terminal 43 to rectifier or diode 51 which in turn is connected to terminal 59 of capacitor 55 so as to receive power from generator 30 during the charge mode of the system, that is when contactors 22 and 23 are closed.

It should be noted that windings 32a and 32b may be series connected by removing wire 45 and connecting terminal 42 to terminal 43, and connecting rectifier 51 anode to terminal 41. In this type of connection, the voltage feeding winding 61 and capacitor 55 will be doubled and the current for charging such components will be approximately half their former values.

Transistor switch Qn is the means by which the charged primary winding 61 and charged capacitor 55 is discharged into each other during the discharge mode of the system when contactors 22 and 23 are open. Since Qn is an NPN type transistor that is complementary to Qp and Q1, when Qp and Q1 are turned off by contactors 22 and 23 opening, Qn is turned on at that time. The collector of Qn being connected to winding 61 and the emitter thereof to capacitor 55, when contactors 22 and 23 are opened, bias current will flow through the base of Qn turning on Qn so that collector current will flow between its collector and emitter, providing a low ohmic electrical path for discharge of charged winding 61 and capacitor 55 therethrough.

Keeping in mind that current flowing through diode 50 is unidirectional due to the unipolar output from winding 32a, and flows in direction 66 to charge winding 61, and likewise the unidirectional current flowing through diode 51 in direction 56 charges capacitor 55 providing a positive charge as indicated at plate terminal 59 of the capacitor, winding 61 and capacitor 55 cannot discharge before Qn is turned on, inasmuch as there are high impedance paths through Qn when not in its conductive state, and positively polarized current flow due to discharge is prevented by diodes 50 and 51.

Hence, when contactors 22 and 23 are opened to turn off generator 30 including switch Q1, and to turn on Qn, discharge currents represented by direction arrow 67 for discharge from winding 61 and by direction arrow 57 for discharge from capacitor 55, will begin to flow. Discharge current from a charged inductor will continue to flow in the same direction as its charging current, whereas discharge from a capacitor will have a direction reverse to its charge current direction, and hence capacitor 55 discharge current 57 will flow out and in a direction away from its positively charged terminal.

When Qn is turned on, discharge current 57 will begin to flow in the same direction as discharge current 67, and at least for the first cycle of the resultant transient wave, the two currents 57 and 67 will be additive to cause an exceptionally large current swing through winding 61 and hence a high induced voltage, applying Faraday's law of induction.

The high voltage induced in winding 61 will be transferred to secondary winding 62 and multiplied by the turns ratio of transformer 60.

Capacitor 65 of proper voltage rating may be inserted in series with winding 62 if desired, which will resonate winding 62 to the dominant frequency of the resultant transient current flowing between cable 63 and the igniter connected thereto, to increase the igniter's energy level.

Bipolar zener diode assemlby 52 connected between the collector and base of Qn together with resistor 53 connected between base of Qn and its emitter, will serve to regulate the collector-to-base and collector-to-emitter voltages so as not to exceed the manufacturer's ratings for Qn. Although a high voltage, high current rated transistor, Qn can be damaged without the protective features of assembly 52 and the low ohmic value of resistor 53. In some applications, it may be possible to use a unipolar zener diode which has its cathode connected to the collector and its anode to the base in conjunction with resistor 53.

It should also be noted that one basic benefit of using a unipolar waveform, provided by generator 30, is that it already resembles a half-wave rectified signal, thereby making additional rectification by diodes or rectifiers such as 50 and 51 easy to provide. Insofar as the load, consisting of winding 61 and capacitor 55, is concerned it is seeing short pulses, and it should be remembered that pulses will flow through sn inductor in its current form far more rapidly than conventional DC as provided by a battery.

The logic of the configuration of FIG. 1 may be briefly summarized as follows:

| Contactors 22 and 23 | Potential at Junction 25 | State of Generator 30 | State of Qn | Condition of Winding 61 and Capacitor 55 |
|---|---|---|---|---|
| closed | 0 | ON | OFF | charges |
| open | + | OFF | ON | discharges |

FIG. 2 illustrates a disk-contactor timer wherein disk 71 is of electrically conductive material and at ground potential by virtue of being affixeddd to engine distributor shaft 10 which is at ground potential. Disk 71 has electrically insulative members 72 regularly spaced at its periphery within the disk confines. The periphery of the disk is in cooperation with contactor 72 which has a resistor 24 in series therewith, the resistor being connected to junction 13 and serving the same purpose as in FIG. 1. Junction 25 is connected to junction 26 which in turn is connected to bias resistor 34 of generator 30, so that this timer can perform the same functions as the timer in FIG. 1. The remaining circuit to which the timer connects is shown in FIG. 1 with identical functions performed by such circuit and timer as discussed in connection with FIG. 1 configuration.

The logic provided by FIG.2 configuration may be briefly summarized as follows:

| Contactor 73 | Potential at Junction 25 | State of Generator 30 | State of Qn | Condition of Winding 61 and Capacitor 55 |
|---|---|---|---|---|
| in cooperation with conductive portion of disk 71 | 0 | ON | OFF | charges |
| in cooperation with insulative member 72 | + | OFF | ON | discharges |

FIG. 3 illustrates a magnetically generated pulse timer wherein magnetic reluctor wheel 87 is driven by engine distributor shaft 10. A positive DC potential is provided to this timer from junction 13 so that this timer is powered by DC source 12. A voltage divider resistive network 81 and 82 provides approximately +1.2 volts DC to winding 86 wound on permanent magnet core 84. Core 84 has a magnetic pole piece 85 for enabling magnetic flux to be induced in coil 86 by virtue of magnetic protrusions 88 integral with relucter wheel 87 being driven past pole piece 85 due to shaft 10 being driven by the engine. The other end of coil 86 is connected to the base of transistor Q2. Transistor Q2 has resistor 89 connected between its collector and junction 13. The emitter of Q2 is at ground potential, and the collector of Q2 is connected to junction 26 and therefore to resistors 34, 35 and 54 which are the bias resistors for all the transistors in the main circuit associated with this timer. Capacitor 90 of large capacitance value but of low voltage rating, is connected to junction 83, which is the junction of divider network consisting of resistors 81 and 82, and maintains the DC voltage applied to coil 86 relatively constant.

When reluctor wheel 87 is at standstill, the base of transistor Q2 is at positive DC potential and Q2 conducts, thereby lowering the collector of Q2 to ground potential and causing generator 30 to oscillate by virtue of zero bias being applied to the bases of transistors Qp. When reluctor wheel 87 is driven past pole piece 85, protrusions thereon passing pole piece 85 induce a negative-going spike or pulse in winding 86, which pulse is sufficient to overcome the positive DC potential at the base of Q2, thereby lowering the base of Q2 to a negative potential and stopping conduction of Q2 which raises the collector potential of Q2 to a positive value thereby applying a +DC bias voltage to bias resistor 34 to inhibit generator 30 from oscillating.

The logic provided by FIG. 3 configuration may be briefly stated as follows:

| Reluctor Wheel 87 Driven so that | Potential at Base of Q2 | State of Q2 | State of Generator 30 | State of Qn | Condition of Winding 61 and Capacitor 55 |
| --- | --- | --- | --- | --- | --- |
| pole piece 85 is between protrusions 88 | + | ON | ON | OFF | charges |
| pole piece 85 in line with protrusion 88 | − | OFF | OFF | ON | discharges |

FIG. 4 illustrtaes an optically generated pulse timer wherein optically opaque disk 91 is driven by distributor shaft 10. Disk 91 has a number of apertures 92 regularly spaced from each other at the disk periphery within the confines of the disk. A lamp or light emitting diode 93 is connected to +DC potential at 13, and light-activated transistor switch Q3 has its collector connected to +DC potential at 13, the emitter of Q3 being connected to resistor 95 and the other side of resistor 95 being at ground potential. The emitter of Q3 is connected to bias resistor 34 by virtue of being connected to junction 26, so that this timer can bias generator 30 instead of the timer used in FIG. 1. When disk 91 is driven so that its opaque portion blocks light beam 94 emanating from lamp 93, the base of Q3 is effectively at zero potential and does not conduct, thereby causing its emitter to be at ground or zero potential and biasing resistor 34 to zero potential causing oscillation in generator 30. When disk 91 is driven to a position so that one of apertures 92 permits passage of light beam 94 therethrough to impinge on the base of Q3, the base of Q3 is raised to a positive potential which causes Q3 to conduct, thereby raising its emitter to a positive potential and biasing resistor 34 to a positive DC potential to stop oscillation of generator 30.

The logic provided by FIG. 4 configuration may be briefly summarized as follows:

| Disk 91 Driven so that | Potential at Base of Q3 | State of Q3 | State of Generator 30 | State of Qn | Condition of Winding 61 and Capacitor 55 |
| --- | --- | --- | --- | --- | --- |
| light beam 94 obstructed | 0 | OFF | ON | OFF | charges |
| light beam 94 passes through aperture 92 | + | ON | OFF | ON | discharges |

Referring to FIG. 5, this configuration is a different version of implementing the major principles of the invention as compared with FIG. 1 configuration. In this configuration, primary winding 61 is charged by DC source 12 through transistor switch Q4 whereas capacitor 55 is charged by means of unipolar alternating current source 30a. Source 30a is the same as source 30 except that is does not use switch Q1 in output winding 32 circuit.

According to the illustration of FIG. 5, unipolar power source 30a has its pair of output windings 32a and 32b connected in series with one end of winding 32b being at ground potential. This type of connection of windings 32 enables doubling of the voltage output from generator 30a but decreases the current output by half compared to the parallel connection of windings 32a and 32b. Rectifier or diode 51 is connected in series with winding 32 and capacitor 55.

Such connection of generator 30a enables capacitor 55 to be charged as in the case of FIG. 1 but to a higher voltage level. Generally, a higher induced voltage is provided in primary winding 61 by charging this inductor than can be obtained by charging a capacitor with the same DC voltage. However, with the increased voltage output from generator 30a, capacitor 55 may be charged so that it provides a higher voltage across its plates to a level higher than the induced voltage in winding 61, depending on the magnitude of the voltage output from generator 30a. In such instance, it will be necessary to transpose the collector-emitter connections of Qn so that the collector of Qn would be connected to terminal 59 and the emitter of Qn would be connected to terminal 58. Since Qn is an NPN type transistor, it is necessary to raise the voltage level of the collector above the voltage level of the emitter so as to enable the starting of conduction in Qn when positive bias is applied to the base of Qn from control point 25 through resistor 54 at the time when contactors 22 and 23 are opened. Qn protective devices 52 and 53 are the same as in the FIG. 1 configuration.

Additionally, PNP type transistor switch Q4 enables DC power from battery 12 at junction 13 to be fed to winding 61 for charging same during the charge mode of the system, accomplished when contactors 22 and 23 are closed, at which time the base of Q4 is at zero potential, by virtue of its connection from control point 25 through resistor 48, to cause base current to flow and hence to cause collector current to flow through Q4. Zener assembly 46 consideration and low ohic resistor 47 are the same as discussed for zener assembly 52 and resistor 53 in connection with FIG. 1. Therefore, Q4 enables charge current to flow through winding 61 during the charge mode, and to cease flowing during the discharge mode when contactors 22 and 23 are opened.

Consequently, during the discharge mode, Qn will provide an electrical conduction path between its collector and emitter and permit the discharge of capacitor 55 and winding 61 in the same manner as discussed in connection with FIG. 1.

It should be noted that in usage of either FIG. 1 or FIG. 5 configuration, experiments have shown that the transformer used in either generator 30 or 30a should have a core which provides a relatively steep hysterysis (B-H) loop because such core will be more rapidly responsive to duty cycling or switching the generator on and off. The use of such core will inhibit residual stored energy in the core from flowing during the discharge mode of the system. In the FIG. 1 configuration such residual energy flow inhibition will be aided by the use of switch Q1.

The performance of FIG. 5 configuration and its ability to use any of the timers shown in FIGS. 1 thorugh 4, is the same as in the case of the FIG. 1 configuration.

The FIG. 5 configuration logic may be briefly summarized as follows:

| Contactors 22 and 23 | Potential at Junction 25 | State of Generator 30a | State of Q4 | State of Qn | Condition of Winding 61 and Capacitor 55 |
|---|---|---|---|---|---|
| closed | 0 | ON | ON | OFF | charges |
| open | + | OFF | OFF | ON | discharges |

FIG. 6 configuration represents a slight variation in the configuration of FIG. 1. This configuration provides unipolar alternating current source 30b wherein the drawing omits switch Q1. However, it should be noted that the use of switch Q1 in the common ground leg for windings 32a and 32b as in FIG. 1 is quite desirable in that it cuts off energy feed residual in the tranformer core of source 30b during the discharge mode and provides a clean separation between igniter firing waveforms. Likewise, rectifier or diode 51 is also omitted from the drawing. But such diodes 50 and 51 may also be optionally used between windings 32a and 32b and their respective switches Q5 and Q6, or between the collectors of these switches and terminals 58 and 59 respectively. Switches Q5 and Q6 are of the PNP type which may be used with or without such diodes.

Winding 32a is connected to diode 50 and diode 50 is connected to the emitter of Q5. The collector of Q5 is connected to terminal 58 of primary winding 61. Winding 32b is connected to the emitter of Q6 and the collector of Q6 is connected to terminal 59 of capacitor 55. Bias resistors 148 and 149 provide base current limitation for transistors Q5 and Q6 respectively. Such bias resistors are connected to a common junction 26 which is fed by control point 25, and in turn which feeds bias resistor 34 of generator 30b to limit the base current in transistors Qp as well as feeding bias resistor 54 to limit the base current in transistor Qn.

The basic benefit derived by FIG. 6 configuration is the use of switches Q5 and Q6 with or without diodes 50 and 51 respectively. Without switches Q5 and Q6, these diodes will pass negative-going currents so that such diodes enable blockage of current flow back into windings 32a and 32b for positive-going currents thus draining and wasting some of the charge in winding 61 and in capacitor 55. On the other hand, when switches Q5 and Q6 become non-conducting during the discharge mode, they provide high impedance paths and inhibit charge current flow drainage and waste no matter which direction is taken by the several discharge currents from the primary winding and capacitor.

The FIG. 6 configuration logic may be briefly summarized as follows:

| Contactors 22 and 23 | Potential at Junction 25 | State of Generator 30b | States of Q5 and Q6 | State of Qn | Condition of Winding 61 and Capacitor 55 |
|---|---|---|---|---|---|
| closed | 0 | ON | ON | OFF | charges |
| open | + | OFF | OFF | ON | dischrges |

Figure 7:
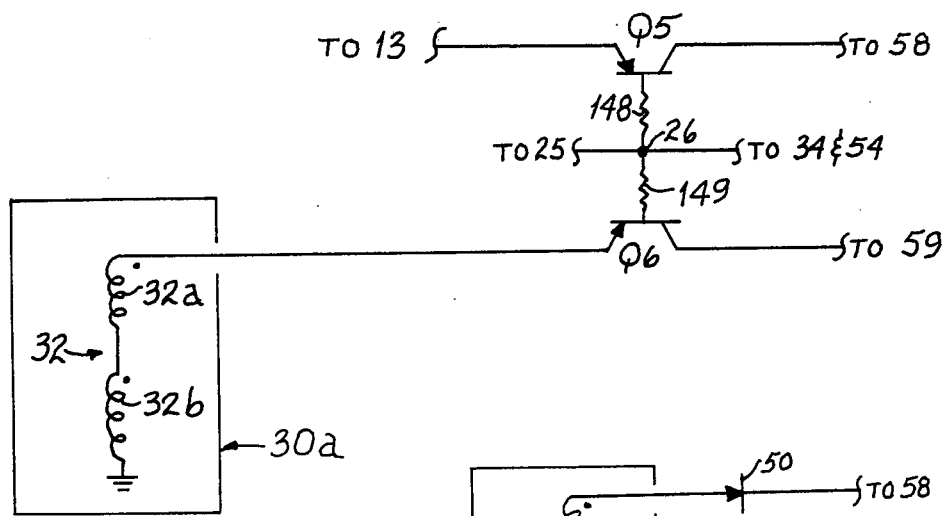
FIG. 7 is a partial electrical schematic representing a slight variation of the schematic of FIG. 5.

FIG. 7 configuration represents a slight variation in the configuration of FIG. 4. This configuration provides alternating current source 30a as in the case of FIG. 5. Transistor switch Q5 is shown substituting for transistor switch Q4 without the need of surge protectors as shown in connection with switch Q4. Rectifier or diode 51 is substituted by transistor switch Q6, and although this drawing figure does not show the presence of a diode in series with winding 32 or in series with the collector of Q6, such diode may be desireable to provide additional rectification of the output from generator 30a. Additionally it may also be desirable to insert a switch such as Q1 shown in FIG. 1 in series with the ground terminal so as to suppress residual energy storage from flowing during the discharge mode, as discussed above.

Switch Q5 performs the same functions as stated in connection with switch Q4 of FIG. 5. Switch Q6 performs the same functions as discussed in connection with the same numbered switch in FIG. 6.

The same benefits are derived by the use of transistor switches instead of diodes as discussed in connection with FIG. 6, except here capacitor 55 will be charged to a higher voltage level, and it may be necessary to transpose the collector-emitter connections of Qn so that the collector is connected to terminal 59 and the emitter to terminal 58 in order to provide a voltage difference between collector and emitter of Qn where the collector voltage is higher than the emitter, even to a slight extent. It is pointed out that although the diode was omitted in this configuration it may also be used in series with winding 32 or in series with the collector of Q6.

The FIG. 7 configuration logic may be briefly summarized as follows:

| Contactors 22 and 23 | Potential at Junction 25 | State of Generator 30a | State of Q5 and Q6 | State of Qn | Condition of Winding 61 and Capacitor 55 |
|---|---|---|---|---|---|
| closed | 0 | ON | ON | OFF | charges |

-continued

| Contactors 22 and 23 | Potential at Junction 25 | State of Generator 30a | State of Q5 and Q6 | State of Qn | Condition of Winding 61 and Capacitor 55 |
|---|---|---|---|---|---|
| open | + | OFF | OFF | ON | discharges |

Figure 8:
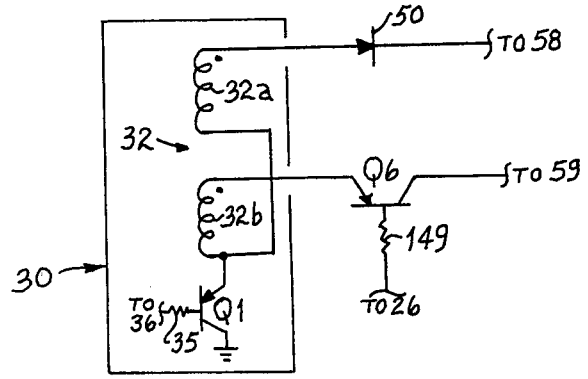
FIG. 8 is a partial electrical schematic representing a slight variation of the schematic of FIG. 1.

FIG. 8 configuration represents a slight variation in the configuration of FIG. 1. This configuration differs from FIG. 1 only in that transistor switch Q6 is substituted for diode 51. The emitter of switch Q6 is connected to winding 32b and the collector is connected to terminal 59. Bias resistor 149 is connected to junction 26 which is in turn connected to control point 25. Hence, upon activation of generator 30 during the charge mode of the system, switch Q6 is also activated being of the PNP type, the same as the transistors in generator 30, so as to enable charging capacitor 55 by means of power provided by winding 32b.

The logic of FIG. 8 configuration may be summarized as follows:

| Contactors 22 and 23 | Potential at Junction 25 | State of Generator 30 | States of Q1 and Q6 | State of Qn | Condition of Winding 61 and Capacitor 55 |
|---|---|---|---|---|---|
| closed | 0 | ON | ON | OFF | charges |
| open | + | OFF | OFF | ON | discharges |

I claim:

1. An inductive-capacitive charge-discharge ignition system with first and second modes of operation, said system having at least one igniter for creating an electrical arc during each second mode, comprising the combination of:
   an ignition transformer having a single primary winding, said primary winding having a first terminal and a second terminal;
   a capacitor having a first terminal and a second terminal, the second terminal of the primary winding being connected to the second terminal of the capacitor;
   power means, coupled to the first terminal of the primary winding and the first terminal of the capacitor, for independently charging said primary winding and capacitor during the first mode, the charging currents in the primary winding and capacitor being in a first direction;
   electronic switching means, bridging said first terminals, for establishing an electrically conductive path between said first terminals during the second mode thereby initiating a discharge current from the primary winding in said first direction and initiating a discharge current from said capacitor in a second direction opposite to the first direction so as to add the initiated discharge currents; and
   timing means, coupled to the power means and electronic switching means, for activating the power means during the first mode and for activating said electronic switching means during the second mode.

2. The system as stated in claim 1, wherein said power means is an alternating current source and includes unidirectional current control means connected to the output of said source for establishing said charging currents in said first direction.

3. The system as stated in claim 2, wherein the unidirectional current control means constitutes rectifying means.

4. The system as stated in claim 1, including an electrical surge protector connected between said first terminals.

5. The system as stated in claim 1, wherein said ignition transformer has a secondary winding magnetically coupled to the primary winding and including a capacitively reactive component connected to the secondary winding.

6. The system as stated in claim 1, wherein said power means includes an alternating current source coupled to the first terminal of the capacitor and a direct current source coupled to the first terminal of the primary winding.

7. A method of igniting fuel in a fuel burning engine, comprising in combination the steps of:
   charging a primary winding of an ignition transformer and a capacitor and establishing charging currents in said primary winding and capacitor flowing in a first direction; and
   discharging the primary winding so that the discharge current therefrom flows in said first direction, and discharging the capacitor so that the discharge current therefrom flows in a second direction opposite to the first direction thereby adding the discharge current of the capacitor to the discharge current of the primary winding.

8. The method as stated in claim 7, including the further steps of:
   inducing a voltage in the primary winding which is proportional to the time rate of change of the sum of said discharge currents; and
   transferring the induced voltage to a secondary winding of said ignition transformer for creating an electrical arc across igniter electrodes coupled to the secondary winding.

9. The method as stated in claim 7, including the further step of:
   creating an electrical arc between electrodes of an igniter coupled to a secondary winding of said ignition transformer wherein said arc is as much as 350 thousandths of an inch in length.

10. The system as stated in claim 1, wherein said power means is an alternating current source, and including a unidirectional current control device connected between the output of said source and the primary winding.

11. The system as stated in claim 10, wherein the unidirectional current control device constitutes a diode.

* * * * *